US010565994B2

(12) United States Patent
Huang et al.

(10) Patent No.: US 10,565,994 B2
(45) Date of Patent: Feb. 18, 2020

(54) INTELLIGENT HUMAN-MACHINE CONVERSATION FRAMEWORK WITH SPEECH-TO-TEXT AND TEXT-TO-SPEECH

(71) Applicant: General Electric Company, Schenectady, NY (US)

(72) Inventors: Ching-Ling Huang, San Ramon, CA (US); Raju Venkataramana, Dublin, CA (US); Yoshifumi Nishida, San Jose, CA (US)

(73) Assignee: General Electric Company, Schenectady, NY (US)

( * ) Notice: Subject to any disclaimer, the term of this patent is extended or adjusted under 35 U.S.C. 154(b) by 156 days.

(21) Appl. No.: 15/827,731

(22) Filed: Nov. 30, 2017

(65) Prior Publication Data

US 2019/0164554 A1 May 30, 2019

(51) Int. Cl.
*G10L 13/033* (2013.01)
*G10L 15/26* (2006.01)
(Continued)

(52) U.S. Cl.
CPC .......... *G10L 15/26* (2013.01); *G06F 16/3329* (2019.01); *G06F 16/60* (2019.01);
(Continued)

(58) Field of Classification Search
CPC ....... G10L 13/00; G10L 13/02; G10L 13/033; G10L 13/0335; G10L 13/04;
(Continued)

(56) References Cited

U.S. PATENT DOCUMENTS 6,006,187 A * 12/1999 Tanenblatt ............ G10L 13/033
704/255
6,029,132 A * 2/2000 Kuhn ...................... G10L 13/08
704/258

(Continued)

OTHER PUBLICATIONS

O'Shaughnessy, Douglas "Interacting With Computers by Voice: Automatic Speech Recognition and Synthesis", Proceedings of the IEEE, http://ieeexplore.ieee.org/abstract/document/1230211/, vol. 91, Issue 09, Sep. 2003, DOI: 10.1109/JPROC.2003,817117, (pp. 1272-1305, 34 total pages).

(Continued)

*Primary Examiner* — Eric Yen
(74) *Attorney, Agent, or Firm* — Buckley, Maschoff & Talwalkar LLC

(57) ABSTRACT

A method, computer-readable medium, and system including a speech-to-text module to receive an input of speech including one or more words generated by a human and to output data including text, sentiment information, and other parameters corresponding to the speech input; a processing module like Artificial Intelligence to generate a reply to the speech input, the reply including a textual component, sentimental information associated with the textual component, and contextual information associated with the textual component; and a text-to-speech module to receive the textual component, sentimental information, and contextual information and to generate, based on the received textual component and its associated sentimental information and contextual information, a speech output including one or more spoken words, the spoken words to be presented with at least one of a pace, a tone, a volume, and an emphasis representative of the sentimental information and contextual information associated with the textual component.

15 Claims, 7 Drawing Sheets

(51) Int. Cl.
*G06F 16/60* (2019.01)
*G06F 16/332* (2019.01)
*G10L 13/04* (2013.01)
*G06N 5/04* (2006.01)
*G10L 13/10* (2013.01)
*G10L 15/28* (2013.01)
*G10L 15/24* (2013.01)
*G10L 13/047* (2013.01)
*G10L 15/22* (2006.01)

(52) U.S. Cl.
CPC .............. *G06N 5/04* (2013.01); *G10L 13/033* (2013.01); *G10L 13/0335* (2013.01); *G10L 13/04* (2013.01); *G10L 13/043* (2013.01); *G10L 13/047* (2013.01); *G10L 13/10* (2013.01); *G10L 15/22* (2013.01); *G10L 15/24* (2013.01); *G10L 15/265* (2013.01); *G10L 15/28* (2013.01); *G10L 2015/223* (2013.01); *G10L 2015/225* (2013.01); *G10L 2015/226* (2013.01); *G10L 2015/227* (2013.01); *G10L 2015/228* (2013.01)

(58) Field of Classification Search
CPC ..... G10L 13/043; G10L 13/047; G10L 13/10; G10L 15/22; G10L 2015/221; G10L 2015/223; G10L 2015/225; G10L 2015/226; G10L 2015/227; G10L 2015/228; G10L 15/24; G10L 15/26; G10L 15/265; G10L 15/28
See application file for complete search history.

(56) References Cited

U.S. PATENT DOCUMENTS

| | | | |
|---|---|---|---|
| 6,385,586 B1 | 5/2002 | Dietz | |
| 6,785,649 B1* | 8/2004 | Hoory | G10L 13/08 704/235 |
| 6,959,279 B1 | 10/2005 | Jackson et al. | |
| 7,966,185 B2 | 6/2011 | Eide | |
| 8,862,467 B1* | 10/2014 | Casado | G10L 15/22 704/231 |
| 9,336,782 B1* | 5/2016 | Patel | G10L 13/033 |
| 9,570,063 B2 | 2/2017 | Bao et al. | |
| 9,812,151 B1* | 11/2017 | Amini | G10L 21/10 |
| 2003/0014253 A1* | 1/2003 | Walsh | G10L 13/08 704/260 |
| 2003/0225578 A1 | 12/2003 | Kahn et al. | |
| 2004/0172257 A1* | 9/2004 | Liqin | G10L 13/00 704/277 |
| 2006/0229872 A1* | 10/2006 | Eide | G10L 13/033 704/260 |
| 2006/0229873 A1* | 10/2006 | Eide | G10L 13/027 704/260 |
| 2008/0172234 A1* | 7/2008 | Eide | G10L 13/047 704/260 |
| 2009/0048843 A1 | 2/2009 | Nitisaroj et al. | |
| 2010/0076752 A1* | 3/2010 | Zweig | G10L 15/063 704/10 |
| 2011/0273455 A1* | 11/2011 | Powar | G10H 1/368 345/473 |
| 2012/0239390 A1* | 9/2012 | Fume | G10L 13/10 704/220 |
| 2013/0080175 A1* | 3/2013 | Mori | G06F 17/218 704/260 |
| 2014/0025383 A1* | 1/2014 | Dai | G10L 13/00 704/260 |
| 2014/0067367 A1* | 3/2014 | Simmons | G09B 17/003 704/8 |
| 2014/0067397 A1 | 3/2014 | Radebaugh | |
| 2014/0278444 A1 | 9/2014 | Larson et al. | |
| 2014/0297764 A1* | 10/2014 | Skiba | H04M 3/5175 709/206 |
| 2014/0337009 A1* | 11/2014 | Kau | G06F 17/274 704/9 |
| 2015/0025890 A1 | 1/2015 | Jagatheesan et al. | |
| 2015/0046164 A1 | 2/2015 | Maganti | |
| 2016/0078859 A1 | 3/2016 | Luan et al. | |
| 2016/0198040 A1 | 7/2016 | Karimi-Cherkandi et al. | |
| 2016/0329043 A1* | 11/2016 | Kim | G10L 13/10 |
| 2017/0256262 A1 | 9/2017 | Ramachandra et al. | |
| 2018/0261203 A1* | 9/2018 | Zoller | G10L 13/027 |

OTHER PUBLICATIONS

Aref, Mostafa M. "A Multi-Agent System for Natural Language Understanding", Integration of Knowledge Intensive Multi-Agent Systems International Conference, http://ieeexplore.ieee.org/abstract/document/1245018/, Sep. 30-Oct. 4, 2003, (pp. 36-40, 5 total pages).

Anguera, Xavier et al., "Automatic Synchronization of Electronic and Audio Books Via TTS Alignment and Silence Filtering", Multimedia and Expo International Conference, http://ieeexplore.ieee.org/abstract/document/6012185/, Jul. 11-15, 2011, 6pgs.

* cited by examiner

- Administrator: "Any warnings at this factory now?"
- Control Room AI:
  - Inputs to Text-to-Speech rendering: (text and sentiment are in sync)
    - Text:   Mid level alert: temperature sensor indicates the machinery 3B1A is overheated at 137F.  Up 30% from normal range.
    - Sentiment:   ^^^^^^^^^^^^^^_____**__________*_____
  - *  ^ = urgent, high pitch, * = slow, loud, stress, _ = normal  (these are just examples. There can be more types of emotion.)
  - Inputs to Speech-to-Text parsing:
  - Possible human response (a probability distribution based on data, previous events and history):
    - More information about sensor data. (40%)
    - Dispatch an engineer to inspect.  (35%)
    - Remote shutdown from control room. (20%)
    - Others.. (5%)
- Administrator: "Ask Jerry to inspect.  Send info to his mobile device."

FIG. 3

- Engineer: "Háblame del uso de energía de esta fábrica." ← 405

- Control Room AI:
  - Inputs to Text-to-Speech rendering: (text and sentiment are color-coded and in sync)
    - Text: Durante las últimas 2 horas, el consumo de electricidad es 13,7 KW, que es superior al rango de funcionamiento normal. ← 410
    - Sentiment: ******* ............ ^^^^^^^^ ............ ← 415
    - ^ = urgent, high pitch, * = slow, loud, stress, . = normal (these are just examples. There can be more types of emotion.) ← 417
  - Inputs to Speech-to-Text parsing:
    - Possible human response (a probability distribution based on data, previous events and history):
      - Details of energy usage by categories. (50%)
      - The majority of energy usage. (25%)
      - Recommendation of operation scheduling to reduce energy. (20%) ← 420
      - Others. (5%)

- Engineer: "Déme los detalles del desglose de energía." ← 425

*FIG. 4*

- Administrator: "What is the status of turbine number 15?" ← 505

- Control Room AI:
  - Inputs to Text-to-Speech rendering: (text and sentiment are color-coded and in sync)
    - Text:     Here is the status of turbine number 50. Temperature is 137F. Vibration level is 5. Pressure level is 50. ← 510
    - Sentiment: ✶✶✶✶✶✶✶✶✶✶✶✶✶✶✶✶✶✶ ........................... +++ ................................... ++ .................................. ← 515
      - ✶ = slow, loud, stress; . = normal; += a little slow, a little loud. ← 517

- Administrator: "No. I want to check turbine number 15." ← 520

- Control Room AI:
  - Inputs to Text-to-Speech rendering: (text and sentiment are color coded and in sync)
    - Text:     Sorry. Here is the status of turbine number 15. Temperature is 152F. Vibration level is 10, Pressure level is 85. ← 525
    - Sentiment: ▲▲▲▲▲▲▲▲▲▲▲▲▲▲▲▲▲▲▲▲ .................................. +++ ........................................ ++ ........................... +++ .. ← 530
      - ▲ = very slow, explicit stress; += a little slow, a little loud; . = normal ← 532

INTELLIGENT HUMAN-MACHINE CONVERSATION FRAMEWORK WITH SPEECH-TO-TEXT AND TEXT-TO-SPEECH

BACKGROUND

The field of the present disclosure relates generally to speech-to-text recognition and text-to-speech generation, and more particularly, to systems, devices and methods of a framework integrating speech-to-text and text-to-speech modules to provide intelligent interactions with humans.

Some traditional systems intended to support spoken communication between humans and devices, machines, and services are limited. In some systems, the speech spoken by a human might not be accurately understood or interpreted by the machine, application, or service. In some instances, the machine, application, or service may have trouble discerning the individual words in the spoken speech. In some other instances, the spoken words themselves may be understood but the full meaning of the spoken words might not be fully understood by the machine, application, or service. In some instances, speech generated by a machine may fail to convey an emotion, urgency, or time-critical nature of information in a manner that a human can fully and accurately comprehend the idea or warning being communicated quickly.

It is noted that human generated natural language speech is oftentimes understood by humans hearing such speech to include more meaning than the words alone might indicate. The additional meaning of human speech might be conveyed in the sentiments and emotions attached to the spoken words by the speaking human. Some sentiments and emotions might be conveyed in terms of the pace, rate, tone, volume, pitch, etc. of the speech, the emphasis placed on the spoken words, the volume of the spoken words, and other aspects. Traditionally, machines, applications, services, and other artificial systems fail to fully and accurately recognize human speech and/or produce natural sounding speech in varying contexts and situations.

Therefore, there exists a need for methods and systems that support and facilitate human and artificial systems speech interactions that efficiently and intelligently capture and produce natural language.

BRIEF DESCRIPTION

In one aspect, an embodiment of the present disclosure relates to a system or platform including a speech-to-text module to receive an input of speech including one or more words generated by a human and to output data including text, sentiment information, and other parameters corresponding to the speech input; a processing module (e.g., an AI processor) to generate a reply to the speech input, the reply including a textual component, sentimental information associated with the textual component, and contextual information associated with the textual component; and a text-to-speech module to receive the textual component, sentimental information, and contextual information and to generate, based on the received textual component and its associated sentimental information and contextual information, a speech output including one or more spoken words, the spoken words to be presented with at least one of a pace, a tone, a volume, urgency, volume, rate, accent, excitement, and an emphasis representative of the sentimental information and contextual information associated with the textual component.

In other embodiments, a process may be executed to perform at least some of the features of the systems and platforms disclosed herein. In yet another example embodiment, a tangible medium may embody executable instructions that can be executed by a processor-enabled device or system to implement at least some aspects of the processes of the present disclosure.

DRAWINGS

These and other features, aspects, and advantages of the present disclosure will become better understood when the following detailed description is read with reference to the accompanying drawings in which like characters represent like parts throughout the drawings, wherein:

FIG. 3 is an illustrative example of some aspects, including speech input(s) and speech output(s) for a first exemplary scenario, according to some embodiments herein; and FIG. 4 is an illustrative example of some aspects, including speech input(s) and speech output(s) for a second exemplary scenario, according to some embodiments herein;

FIG. 5 is an illustrative example of some aspects, including speech input(s) and speech output(s) for a third exemplary scenario, according to some embodiments herein;

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Figure 1:
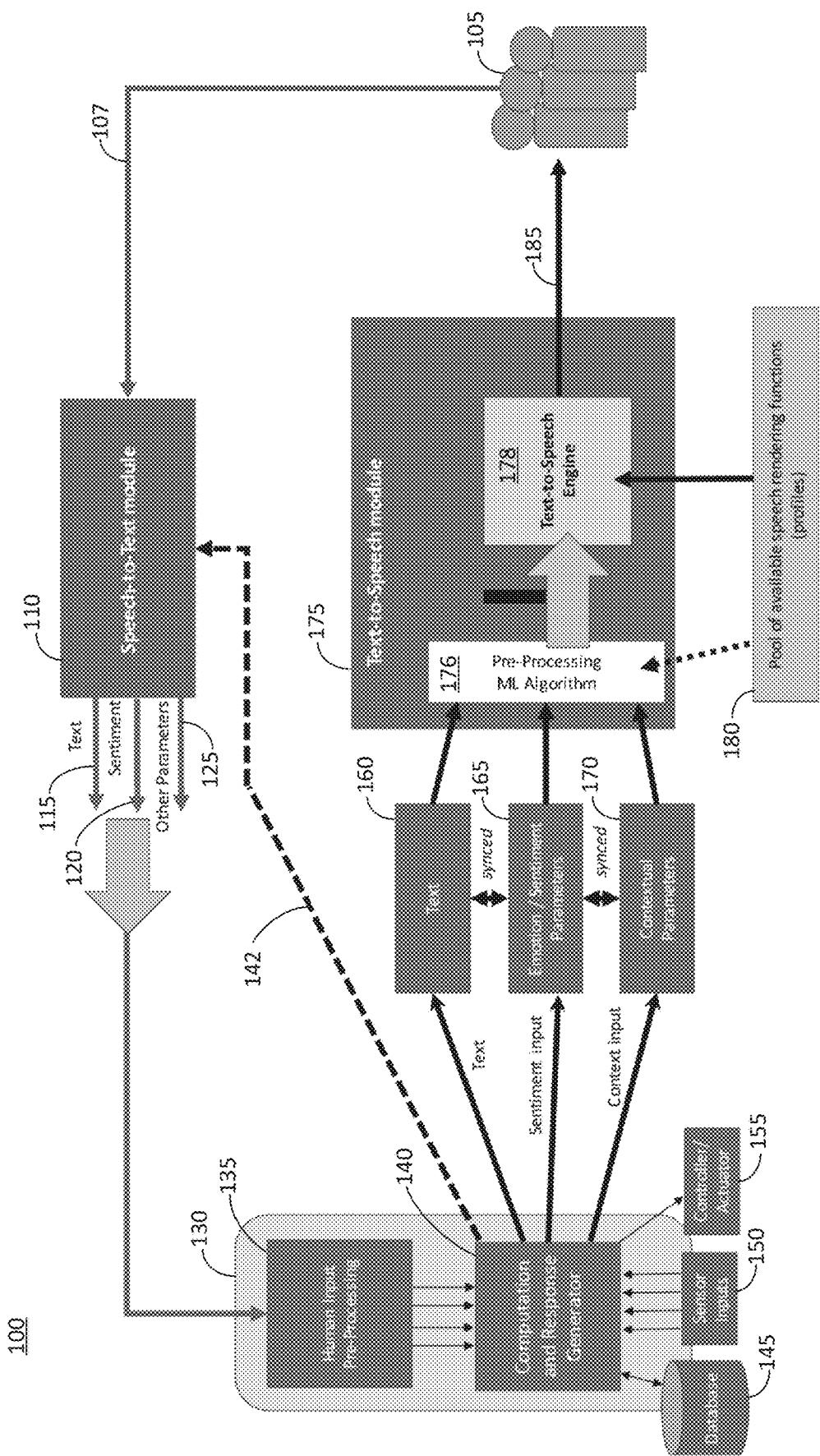
FIG. 1 is an illustrative example of a system framework diagram depicting some aspects of an embodiment herein.

FIG. 1 is an illustrative example of a system framework 100 that may support some of the aspects disclosed herein. Namely, framework 100 supports, facilitates, and provides a mechanism for receiving audio including speech 107 from one or more human(s) 105. The speech may include one or more words (and other utterances) in an audio format. In some aspects herein, the speech is not limited to any one particular language. In some aspects, knowledge the particular language of the speech may be used to interpret the objective meaning of the words in the text, as well as other aspects related to the spoken words.

The audio 107 from human(s) 105 is received by a speech-to-text (STT) module 110 as an input thereto. STT module 110 might operate to parse the received speech into its constituent individual words. For example, the audio from a human may include the sentence, "The temperature of the room is 75 degrees." Accordingly, STT module 110 might parse the received sentence into the individual words (i.e., text 115). In addition to generating an output including the text (i.e., words) parsed from the audible speech, the STT module herein also generates a sentiment component or information 120 associated with the generated textual component. The sentiment information 120 includes indications of an emotion or feeling associated with the received speech. This sentiment information is determined by STT module 110 based on the received speech 107. The sentiment information 120 may include any indicator representative of an emotion or feeling, such as for example, excitement, joy, pain, fear, acceptance, contentment, panic, calmness, confidence, and other emotions. The sentiment information may be implemented in a message or file, and not necessarily limited to any particular format or protocol, including but not limited to metadata.

In addition to generating an output including the text 115 (i.e., words) parsed from the audible speech, STT module 110 herein may also generate "other parameters" information 125 associated with the generated textual component 115. The other parameters information 125 might include indications of a role of the speaker, a time the speech was generated (e.g., a timestamp), a location of the speaker, a subject matter or context of the speech input (e.g., whether the speech is part of an on-going conversation, a past conversation, or a new conversation unrelated to a current or past conversation, etc.), a subject matter of the speech (e.g., relates to a particular event, entity, system, product, location, and/or other subject matter, either generally or a specific instance) and other aspects, factors, and considerations. The other parameters information 125 may be determined by STT module 110 based, at least in part, on the content of received speech 107. The other parameters information 125 may be implemented in a message or file, and not necessarily limited to any particular format or protocol, including but not limited to metadata.

In some embodiments, STT module 110 might generate output data including text 115, sentiment information 120, and other parameters information 125 corresponding to the speech input 107 based, at least in part, on knowledge information 142 received from an artificial intelligence (AI) processor (also referred to herein as a "processor") module 130. In some embodiments, module 130 may be comprise a digital twin of physical assets, processes, and systems, including a thorough understanding and knowledge of the physical assets, processes, and systems. Processor module 130 may include and/or integrate, in some aspects, artificial intelligence, machine learning, and analytics concerning certain physical assets, systems, and processes and use the same in providing language processing systems, frameworks, and processes as disclosed herein. Processor module 130 may be implemented, in some embodiments by one or more systems, devices, components, applications, services, and other machine-based entities, including hardware features, software features, and combinations thereof.

Processor module 130 may include a pre-processing unit 135 to pre-process human input received as an output from STT module 110, including text 115, sentiment information 120, and other parameters information 125. In some aspects, pre-processing unit 135 may operate to (pre-)process data from STT 110 to configure it in a desired (optional or required) format, protocol, size, data structure, synchronization, and other aspects for further processing by processor module 130. In some aspects, pre-processing unit 135 may determine a request type, role, priority, context, and other parameters related to speech 107 based, at least in part, on the text 115, sentiment information 120, and other parameters information 125 received from STT 110.

Processor module 130 may include a computation and response generator 140. Computation and response generator 140 (also referred to a response generator herein) may operate to dynamically and automatically generate a reply or response to speech 107 generated by human(s) 105. In some embodiments, response generator receives pre-processed human input data (e.g., the text 115, sentiment information 120, and other parameters information 125 received from STT 110) from pre-processor 135 and additional information from one or more data sources such as, for example, a database 145, sensors 150, controllers and/or actuators 155, as well as other sources of data (e.g., data streams, other devices, etc.). The additional information from the one or more data sources may include, for example, information from database 145 that stores, receives, and manages data such as, for example, location and/or facility related information including personnel roles and equipment specifications; information from sensors 150 that might provide status reports or data from one or more sensors that monitor one or more devices, systems, and environments; and information from controllers and/or actuators 155 that might provide a status or report for one or more devices, systems, and components controlled or operated, at least in part, under the direction the controllers and operators.

In some embodiments, response generator 140 may use information from pre-processor 135 and additional information from other data sources (e.g., database 145, sensors 150, and controllers/actuators 155) as a basis for generating a reply or response to the speech 107. As seen herein, response generator 140 generates a reply based on more than the text parsed from the human(s) generated speech 107, as determined by STT 110. Framework 100 may generate a reply to human-supplied speech based on text 115 parsed from the spoken words and other information and data, including sentiment information 120 and other parameters information 125 associated with the text and additional information received from other sources (e.g., database 145, sensors 150, and actuators/controllers 155).

In some embodiments, STT module 110 may receive at least some knowledge information 142 from response generator 130. The knowledge information may include indications or representations of one or more of the following types of information: expected human responses, keywords, probability distributions (e.g., Bayesian), and knowledge of prior or on-going conversations. Knowledge information 142 may be used by STT 110 to at least aid in its determination of the text 115, sentimental information 120, and other parameters information 125. In some aspects, the provisioning and use of knowledge information 142 provides a pool of contextual and sentimental information that STT can use to more accurately parse the speech 107 to determine the words (i.e., text) therein, as well as more accurately associate appropriate sentiment and other parameters related information to the parsed text.

The text 115, sentiment information 120, and other parameters information 125 generated by STT 110 based on the inputs of received speech 107 and knowledge information 142 may be transmitted to processor 130 wherein response generator 140 generates a reply. In some aspects, platform 100 includes a feedback loop including knowledge information 142 from processor 130 to STT module 110. In some aspects, system or platform 100 may build its knowledge base (e.g., database 145) over time to "learn" to improve an accuracy of the speech recognition aspects of STT module 110, as facilitated and illustrated by the feedback loop including knowledge information 142.

Referring to processor 130 and more particularly response generator 140, response generator 140 might operate to generate a reply or response to the speech 107 based on information from pre-processor 135 and additional information from other data sources (e.g., database 145, sensors 150, and controllers/actuators 155). In some embodiments, reply output(s) from response generator 140 may include textual component 160, sentimental information 165, and contextual information 170. In some embodiments, textual component 160, sentimental information 165, and contextual information 170 may each comprise a distinct file, record, or message. In an instance the textual component 160, sentimental information 165, and contextual information 170 comprise separate files, the separate files may be synchronized to each other timewise such that the features in sentimental information 165 (e.g., indication of emotion(s)) and the features in contextual information 170 (e.g., indications of context such as, for example, role(s), environment, identification of jobs/tasks, language/location/nation, and other factors associated with the reply response) are accurately associated with the words contained in the textual component 160.

Platform 100 may further include a text-to-speech (TTS) module 175 to receive synchronized textual component 160, sentimental information 165, and contextual information 170 from processor module 130 of the reply. TTS module 175 may process the received reply data to generate speech 185 (i.e., one or more machine-generated spoken words) for consumption by human(s) 105. In some embodiments, TTS module 175 includes a pre-processing module 176, which might process the data received thereby using a machine learning algorithm that outputs vector inputs 177 to a text-to-speech engine 178. The vector inputs 177 can include features and indications of an emphasis, rate, pitch, tone, volume, jargon, language, location, and other aspects to characterize each word and sentence of text to be spoken by TTS module 175. In some embodiments, a knowledge base 180 may include a pool of available speech rendering functions (i.e., profiles) that may be used in rendering the speech generated by TTS 175 with a particular style, tone, accent, language etc.

In some embodiments, text-to-speech engine 178 of TTS module 175 may generate speech output 185 based on a processing of information from knowledge base 180 and vector inputs 177, wherein speech 185 is rendered in accordance with the general characteristics of the knowledge base's profile used and the specific characteristics derived from the sentimental information 165 and contextual information 170 associated with the reply text.

In some aspects and embodiments, the system platform disclosed herein provides a mechanism to render speech that can automatically and dynamically render speech by a machine (e.g., an AI infrastructure or service) that includes features and hallmarks of natural language speech as it might be spoken by a human. The features and aspects of sentiment and context supplied in the speech produced by a platform herein may be employed in addition to or notwithstanding a standard voice model (e.g., provided by a 3$^{rd}$-party service or platform, such as for example, Google Assistant, Siri, Alexa, etc.).

In some embodiments, platform 100 and aspects thereof may be implemented to provide a mechanism that can be used by an application to automatically determine how to pattern speech to be presented to a human end-user. In this manner, an application developer might only need to specify the output text for a given input speech for their application, wherein platform 100 (or an application, service, or other technology implementing the functions thereof) can generate the output speech with an appropriate sentiment, tone, inflections, emphasis, accent, choice of language, volume, and pace placed on each word and sentence in the output speech. The output speech may include speech patterns to match it to the emotions and context of the user and/or the subject/issue/problem being addressed in a conversation between the human(s) and machine(s).

In some embodiments and aspects, different languages may dictate their own language-specific and dependent characteristics for speech patterns, including for example, specific inflections, emphasis, accents, etc. on the words and sentences in a speech. The present disclosure is intelligent and flexible to accommodate different languages and the nuances of each language.

Figure 2:
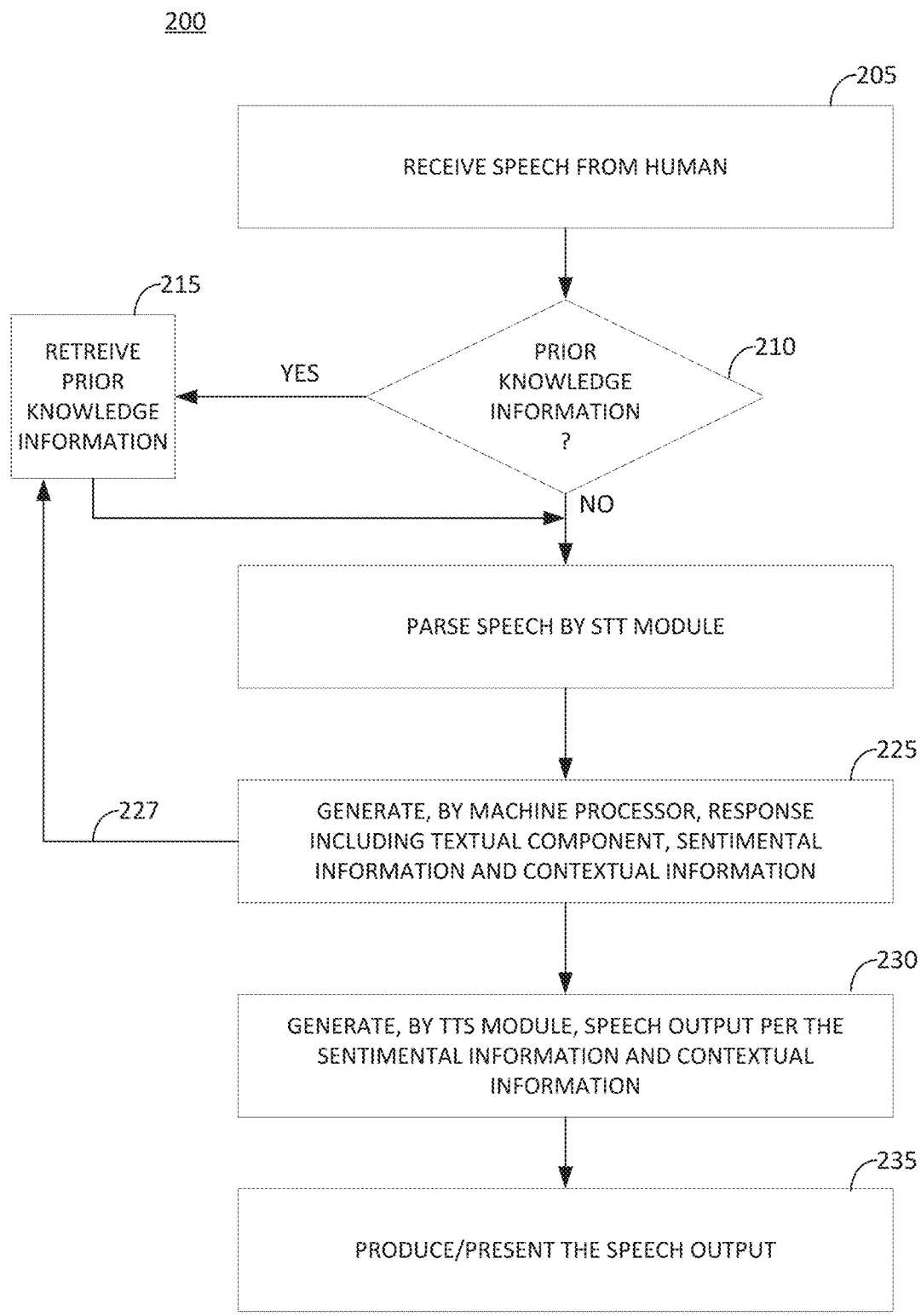
FIG. 2 is an illustrative example flow diagram of a process, according to some embodiments herein.

FIG. 2 is an illustrative depiction of a process 200, in some embodiments herein. In some instances, process 200 may relate to an interactive exchange of speech between and human and a machine. In some aspects, process 200 may be implemented, supported, and/or facilitated by a system framework such as framework 100 in FIG. 1. Process 200 may be discussed primarily in the context of platform 100. However, process 200 is not limited to framework 100.

At operation 205, speech from a human is received by a STT module. The STT module may operate to generate text from the received speech, as well as sentiment information and other parameters information associated with the text parsed from the received speech.

In some embodiments, a determination is made at operation 210 as to whether there is any pertinent prior knowledge of the human inputs, on-going conversations, or expected responses (e.g., FIG. 1, knowledge information 142 that may be provided by AI processor 130) that may better inform the current conversation to aid in the parsing of the received speech for text. In some instances, the prior knowledge referred to herein may include an expected human generated response, a keyword, a probability based distribution, and a knowledge of prior speeches or on-going conversations. If there is pertinent and relevant prior knowledge of the human inputs, on-going conversations, or expected responses, then process 200 proceeds to operation 215 where the prior knowledge of the human inputs, on-going conversations, or expected responses is further used at operation 220 to parse the received speech for text. If there is no pertinent prior knowledge information of the human inputs, on-going conversations, or expected responses, process 200 may bypass operation 215 in some instances.

Operation 225 includes generating, by a processor-based machine (e.g. FIG. 1, processor module 130), a response to the speech input based on the parsed text and its associated sentiment information and other parameters information. The response generated at operation 225 will include a textual component, sentimental information, and contextual information for the machine generated response or reply. In some embodiments, as illustrated by the line 227 pointing from operation 225 to operation 215, the processor may further provide prior knowledge such as an expected response for a next or future conversational interaction (i.e., round) with a human in the process of generating a current response output to the human. As an example, processor module 130 of FIG. 1 may supply some prior knowledge (e.g., an expected human response) while generating a current reply as indicated at operation 225. The prior knowledge made available for use at operation 215 might be based on, for example, a context of the conversation, historical records and/or statistical models of how humans interact with the processor (e.g., AI) and other factors and considerations.

Proceeding to operation 230, output speech can be generated (e.g., FIG. 1, TTS module 175) that includes a sentiment, emotion, tone, etc., as determined by the sentimental information and contextual information associated with the textual component(s) of the reply. Operation 235 includes the presentation or production of the output speech so that it may be consumed (i.e., heard) by a human listener. In some embodiments, the operations of process may be repeated to facilitate interactive conversations between humans and machines.

Some aspects of the present disclosure may be understood in the application or context of, for example, a control room or operations center having an administrator, operator, manager, engineer or other human that interacts with a system, service, platform, application, or other infrastructure embodying AI that can receive and process human inputs, namely text and other data derived from human-supplied speech. The AI herein can provide a response to the initial speech that is in the form of spoken words, wherein the words are presented with a speech pattern that conveys a particular sentiment, including for example emotions, urgency, and other feelings and attitudes.

As an example, an engineer in a control room may pose the question, "How is the plant doing?" Two typical responses may include (a) "The plant is operating fine, all within tolerances." This statement can be "spoken" in an even, monotone and steady rate; and (b) "The plant is on fire!", where this statement is "spoken" at a rushed pace, at a high volume, with significant emphasis on the word "fire". As seen by this simplified example, the sentiment(s) included in speech can efficiently and concisely add meaning(s) that the spoken words that the words alone might not readily convey. For example, a human hearing response statement (b) above would most likely recognize the urgency and severity of the situation described by the statement based, at least in part, on the combination of the words and the tone, inflection, volume, speech rate, word emphasis, etc. at which the words are "spoken".

FIGS. 3-6 each include example inputs and outputs to a platform herein to illustrate aspects of the present disclosure. Referring to FIG. 3, an administrator may ask a control room AI system or application herein about the overall status of a factory by asking question 305 (i.e., "Any warnings at this factory now?") using natural language. In accordance with the present disclosure, inputs to a TTS module of the platform may include reply text and indications of sentiment information associated with the reply text. An example of the reply text is shown at 310 and indicators of the sentiment with which the text 310 is to be rendered or spoken is shown at 315. As shown, the sentiment indicators can represent the different sentiments or emotions of being "urgent, high pitch" (as denoted by the "A" symbol), "slow, loud, stress" (as denoted by the "*" symbol), and "normal" (as denoted by the "." symbol). As illustrated, the different sentiment symbols at 315 are aligned with the corresponding text 310 that is to be rendered with a particular sentiment. The different sentiment identifiers used in the present example are shown at 317. Other emotions and sentiments are possible and within the scope of the present disclosure. Additionally, contextual information may include a description of a role of the human speaker (e.g., control room administrator) and the language used (e.g., English).

Additionally, FIG. 3 further illustrates some example inputs 320 to a STT module of the AI platform where the example inputs include a probability distribution of the possible human response to the generated speech 310. Information 320 might be used by the STT module of the AI engaged in a conversation with the administrator to better (e.g., more efficiently and/or accurately) parse the administrator's speech 325.

FIG. 4 includes a scenario where an engineer speaks statement 405 to a control room AI system or application regarding the energy usage of a factory, in Spanish, using natural language. In accordance with the present disclosure, inputs to a TTS module of the platform herein may include reply text 410 and corresponding indications of sentiment information 415 associated with the reply text, where particular sentiment indicators 417 are aligned or synced with the text 410 to indicate how the text will be rendered with each specific sentiment 415. Contextual information for this example may include a description of a role of the human speaker (e.g., control room engineer) and the language used (e.g., Spanish).

FIG. 4 also illustrates some example inputs 420 to a STT module of the AI platform where the example inputs include a probability distribution of the possible human response to the generated speech 410. Information 420 might be used by the STT module of the AI engaged in a conversation with the engineer to more efficiently and/or accurately parse the engineer's additional speech 425 spoken in a next conversational round or interaction.

FIG. 5 includes an illustrative scenario where an administrator speaks statement 505 to a control room AI system or application regarding the status of a particular turbine using natural language. In accordance with the present disclosure, inputs to a TTS module of the platform may include reply text 510 and indications of sentiment information 515 associated with and aligned or synced the reply text, where an emphasis is placed on the numerical values for the reported parameters in an effort to emphasis this important information to the listening administrator.

FIG. 5 further illustrates the AI platform misunderstanding the initial request for information about turbine number "15" as a request for turbine number "50". In this example, the administrator corrects the AI by responding with statement 520 and the AI then responds with the text 525 and the corresponding sentiment information 530 that will be synchronized with text 525 and used in combination to render a response with the appropriate sentiment for the context and situation of the scenario depicted in the example of FIG. 5.

Figure 6:
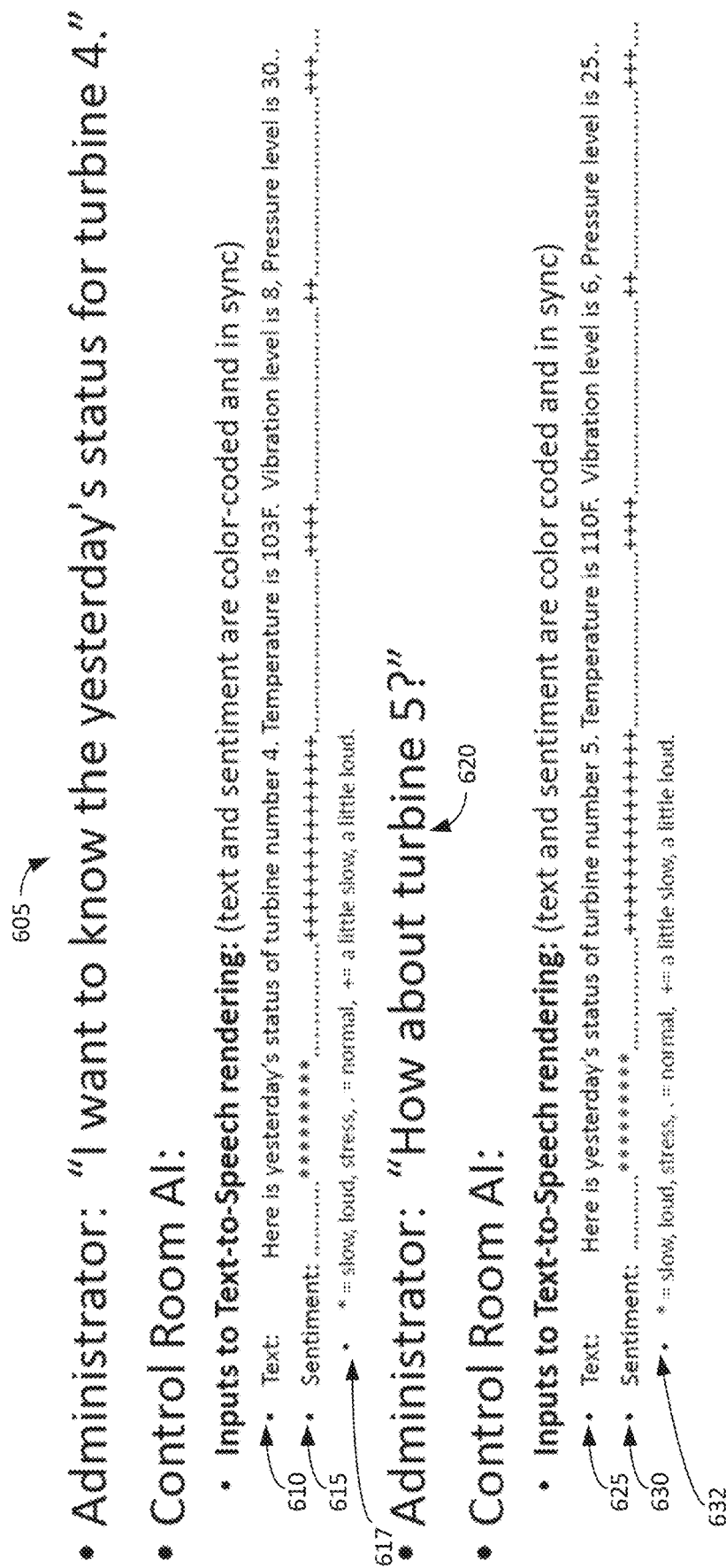
FIG. 6 is an illustrative example of some aspects, including speech input(s) and speech output(s) for a fourth exemplary scenario, according to some embodiments herein.

FIG. 6 includes an illustrative scenario where an administrator speaks statement 605 to a control room AI system or application as disclosed herein regarding the status of a particular turbine (i.e., turbine number 4) using natural language. In accordance with the present disclosure, inputs to a TTS module of the platform may include reply text 610 and indications of sentiment information 615 associated with the reply text, where an emphasis is placed on the word "yesterday" (i.e., to be rendered with a slow, loud, and stressed tone) and the numerical values including "turbine number 4", "103F", and "30" (i.e., to be rendered a little slower and a little louder than the text to be rendered in a "normal" tone) to clarify that the reported values relate to a specific time in the past. FIG. 6 also illustrates an on-going conversation with the AI platform, a request for additional information regarding another turbine (i.e., turbine number 5). In this example, inputs to a TTS module of the platform may further include reply text 620 and indications of sentiment information 630 associated with and synced the reply text 625, where an emphasis is placed on the word "yesterday" and the numerical values in the text to clarify the AI inferred the administrator was still interested in yesterday's status, but now in reference to turbine number 5.

Figure 7:
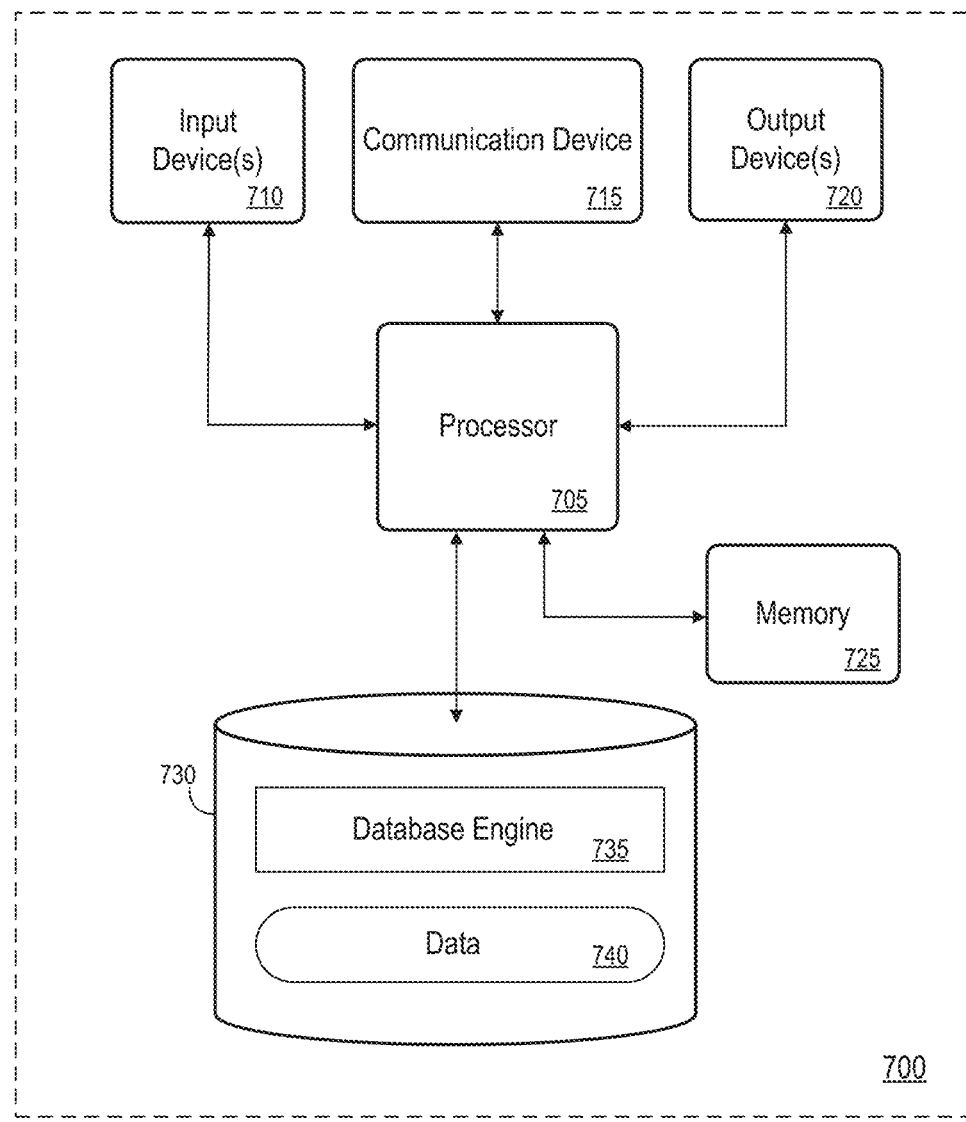
FIG. 7 is an illustrative depiction of a block diagram of a system or device that can support some processes disclosed herein.

FIG. 7 is an illustrative block diagram of apparatus 700 according to one example of some embodiments. Apparatus 700 may comprise a computing apparatus and may execute program instructions to perform any of the functions described herein. Apparatus 700 may comprise an implementation of server, a dedicated processor-enabled device, a user entity device, and other systems, including a cloud server embodiment of at least parts of a platform or framework disclosed herein. For example, apparatus 700 may implement at least a portion of processor module 130 illustrated in FIG. 1. Apparatus 700 may include other unshown elements according to some embodiments.

Apparatus 700 includes processor 705 operatively coupled to communication device 715 to communicate with other systems, data storage device 730, one or more input devices 710 to receive inputs from other systems and entities, one or more output devices 720 and memory 725. Communication device 715 may facilitate communication with other systems and components, such as other external computational assets and data. Input device(s) 710 may comprise, for example, a keyboard, a keypad, a mouse or other pointing device, a microphone, knob or a switch, an infra-red (IR) port, a docking station, and/or a touch screen. Input device(s) 710 may be used, for example, to enter information into apparatus 700. Output device(s) 720 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), solid state storages device, optical storage devices, Read Only Memory (ROM) devices, Random Access Memory (RAM), Storage Class Memory (SCM) or any other fast-access memory. Data storage device 730 might store speech pattern profiles.

Database engine 735 may comprise program instructions executed by processor 705 to cause apparatus 700 to perform any one or more of the processes described herein, including but not limited to aspects of process 200 disclosed in FIG. 2. Embodiments are not limited to execution of these processes by a single apparatus.

Data 740 (either cached or a full database) may be stored in volatile memory such as memory 725. Data storage device 730 may also store data and other program code for providing additional functionality and/or which are necessary for operation of apparatus 700, such as device drivers, operating system files, etc. Data 740 may include data related an asset (e.g., a factory and different operating states associated with equipment and systems operating within that factory such as turbines, etc.) that may be used in the generation of a response to speech from a human concerning a particular asset. In some instances, data 740 may include "prior knowledge" information as disclosed herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed includes:

1. A system comprising:
a speech-to-text processor to receive an input of speech including one or more words generated by a human and to output data including text, sentiment information, and other parameters information corresponding to the speech input;
a processor to generate a reply to the speech input, the reply including a textual component, sentimental information associated with the textual component, and contextual information associated with the textual component; and
a text-to-speech processor to receive the textual component, sentimental information, and contextual information of the reply and to generate, based on the received textual component and its associated sentimental information and contextual information of the reply, a speech output including one or more spoken words, the spoken words to be presented with at least one of a pace, a tone, a volume, an urgency, a rate, an accent pattern, and an emphasis representative of the sentimental information and contextual information associated with the textual component of the reply, wherein the at least one of the pace, the tone, the volume, the urgency, the rate, the accent pattern, and the emphasis of the speech output is determined on a word by word basis and a sentence by sentence basis for the speech output.

2. The system of claim 1, wherein the speech-to-text processor is to further receive additional information to aid the speech-to-text processor to accurately output data including the text, the sentiment information, and the other parameters information corresponding to the speech input, the additional information including at least one of an expected human generated response, a keyword, a probability based distribution, a knowledge of prior speeches, a knowledge of an on-going conversation, and combinations thereof.

3. The system of claim 2, wherein the additional information to aid the speech-to-text processor to accurately output data is received from the processor.

4. The system of claim 1, wherein the processor receives information used thereby to generate the reply to the speech input from at least one of a database, one or more sensors, one or more controllers, and one or more actuators.

5. The system of claim 1, wherein the textual component, the sentimental information associated with the textual component, and the contextual information associated with the textual component are synchronized to each other.

6. The system of claim 5, wherein the processor synchronizes the textual component, the sentimental information, and the contextual information to each other.

7. The system of claim 1, wherein the processor comprises an Artificial Intelligence processor.

8. The system of claim 1, wherein the text-to-speech processor can generate speech based on the received textual component in a plurality of different languages.

9. A computer-implemented method, the method comprising:

receiving, by a first processing module, speech input data derived from speech including one or more words generated by a human, the speech input data including text, sentiment information, and other parameters information corresponding to the speech;

generating, by a second processing module, a reply to the speech input data, the reply including a textual component, sentimental information associated with the textual component, and contextual information associated with the textual component; and transmitting, by a third processing module, the textual component, sentimental information, and contextual information of the reply for the generation of, based on the textual component and its associated sentimental information and contextual information of the reply, a speech output including one or more spoken words, the spoken words to be presented with at least one of a pace, a tone, a volume, an urgency, a rate, an accent pattern, and an emphasis representative of the sentimental information and contextual information associated with the textual component of the reply, wherein the at least one of the pace, the tone, the volume, the urgency, the rate, the accent pattern, and the emphasis of the speech output is determined on a word by word basis and a sentence by sentence basis for the speech output.

10. The method of claim 9, wherein the second processing module receives information used thereby to generate the reply to the speech input from at least one of a database, one or more sensors, one or more controllers, and one or more actuators.

11. The method of claim 9, wherein the textual component, the sentimental information associated with the textual component, and the contextual information associated with the textual component are synchronized to each other.

12. The method of claim 11, wherein the second processing module synchronizes the textual component, the sentimental information, and the contextual information to each other.

13. The method of claim 9, wherein the second processing module comprises an Artificial Intelligence processor.

14. A non-transitory computer readable medium having processor-executable instructions stored thereon, the medium comprising:

instructions to receive speech input data derived from speech including one or more words generated by a human, the speech input data including text, sentiment information, and other parameters information corresponding to the speech;

instructions to generate a reply to the speech input data, the reply including a textual component, sentimental information associated with the textual component, and contextual information associated with the textual component; and instructions to transmit the textual component, sentimental information, and contextual information of the reply for the generation of, based on the textual component and its associated sentimental information and contextual information of the reply, a speech output including one or more spoken words, the spoken words to be presented with at least one of a pace, a tone, a volume, an urgency, a rate, an accent pattern, and an emphasis representative of the sentimental information and contextual information associated with the textual component of the reply wherein the at least one of the pace, the tone, the volume, the urgency, the rate, the accent pattern, and the emphasis of the speech output is determined on a word by word basis and a sentence by sentence basis for the speech output.

15. The medium of claim 14, wherein the textual component, the sentimental information associated with the textual component, and the contextual information associated with the textual component are synchronized to each other.

* * * * *